(12) United States Patent
Surjan et al.

(10) Patent No.: US 6,416,256 B1
(45) Date of Patent: Jul. 9, 2002

(54) METHOD OF MAKING AND APPLYING CHEMICAL ANCHORING ADHESIVE

(75) Inventors: James E. Surjan, St. Charles; Richard J. Ernst, Palatine; Mark S. Timmerman, Elgin; Cyndie S. Hackl, Wauconda; Jeffrey C. Warmolts, Glen Ellyn; Eldridge Presnell, Round Lake Beach, all of IL (US)

(73) Assignee: Illinois Tool Works Inc., Glenview, IL (US)

(*) Notice: Subject to any disclaimer, the term of this patent is extended or adjusted under 35 U.S.C. 154(b) by 0 days.

(21) Appl. No.: 09/625,805

(22) Filed: Jul. 26, 2000

(51) Int. Cl.⁷ .................... E02D 20/00; E04B 1/38

(52) U.S. Cl. .................... 405/259.5; 52/698

(58) Field of Search .................... 405/258.1, 259.1, 405/259.5, 259.6; 52/698; 411/82.3

(56) References Cited

U.S. PATENT DOCUMENTS

| | | | |
|---|---|---|---|
| 3,385,427 A | * 5/1968 | Stouls | 405/259.6 |
| 3,494,990 A | 2/1970 | Balint | |
| 3,708,379 A | 1/1973 | Flint | |
| 3,781,965 A | 1/1974 | Bone | |

(List continued on next page.)

FOREIGN PATENT DOCUMENTS

| | | |
|---|---|---|
| AU | 48487/97 | 6/1998 |
| DE | 197 34 302 | 2/1999 |
| DE | 197 36 850 | 2/1999 |
| DE | 197 39 764 | 3/1999 |
| WO | 98/55772 | 12/1998 |

OTHER PUBLICATIONS

*Technical Guide Supplement HILTI HVA Adhesive Anchoring System*, Hilti, Inc., 1997 pp. 1, 2, 3, 6–11.
*Shell Resins*, EPON® Resin 828 specification sheet, Shell Oil Co., undated.
*Epoxy Curing Agents and Diluents*, ANCAMINE® 1856 Curing Agent specification sheet, Air Products and Chemicals, Inc., undated.
*Epoxy Curing Agents and Modifiers*, ANCAMINE® K54 Curing Agent specification sheet, Air Products and Chemicals, Inc., Feb. 1998.
*Epoxy Curing Agents*, ANCAMINE® 1767 Curing Agent specification sheet, Air Products and Chemicals, Inc., Nov. 1997.

(List continued on next page.)

*Primary Examiner*—Heather Shackelford
*Assistant Examiner*—John Kreck
(74) *Attorney, Agent, or Firm*—Pauley Petersen Kinne & Erickson (57) ABSTRACT

A method of making and applying a chemical anchoring adhesive in the form of a highly viscous, self-contained rope or slug is provided. The rope or slug has an average cross-sectional area determined from a formula that takes into account the cross-sectional area of a borehole, the average cross-sectional area of an anchor pin to be inserted into the borehole, and a penetration factor which reflects penetration of the adhesive into the walls of the borehole. By selecting the proper area for the anchoring adhesive, the rope can be cut into slugs having depths equal to the depths of boreholes. When the slugs are inserted into the boreholes, and anchor pins are driven, the amount of adhesive provided by each slug will be just enough to completely fill the interstitial spaces between the anchor pin and inner wall of the borehole, accounting for penetration of some adhesive into the borehole wall.

25 Claims, 3 Drawing Sheets

U.S. PATENT DOCUMENTS

| | | |
|---|---|---|
| 3,837,981 A | 9/1974 | Flint |
| 3,971,117 A | 7/1976 | Osterhout et al. |
| 4,040,471 A | 8/1977 | McCray et al. |
| 4,340,637 A | 7/1982 | Koob et al. |
| 4,560,902 A | 12/1985 | Kardon |
| 5,027,981 A | 7/1991 | Magister |
| 5,129,977 A | 7/1992 | Leatherman |
| 5,229,438 A | 7/1993 | Ishida et al. |
| 5,352,308 A | 10/1994 | Tomihara et al. |
| 5,447,593 A | 9/1995 | Tanaka et al. |
| 5,486,096 A | 1/1996 | Hertel et al. |
| 5,544,981 A | 8/1996 | Nishida et al. |
| 5,554,240 A | 9/1996 | Toy |
| 5,714,216 A | 2/1998 | Banhardt et al. |
| 5,730,557 A | 3/1998 | Skupien et al. |
| 5,731,366 A | 3/1998 | Moench et al. |
| 5,953,879 A | 9/1999 | Fischer et al. |

OTHER PUBLICATIONS

*Epoxy Curing Agents*, specifications sheets (5 pages), Air Products and Chemicals, Inc., undated.

Acceptance Criteria For Adhesive Anchors In Concrete And Masonry Elements, International Conference of Building Officials, Jan. 1–11, 1999.

*Iron and Steel*, Textbook, Section 6, pp. 17–30, undated.

* cited by examiner

METHOD OF MAKING AND APPLYING CHEMICAL ANCHORING ADHESIVE

FIELD OF THE INVENTION

This invention is directed to an improved method of making and applying a chemical anchoring adhesive into a borehole. The chemical anchoring adhesive is provided in the form of a highly viscous, self-contained rope or slug having a first resin-containing part and a second curing agent-containing part joined along an interface. The slug is sized according to a formula which takes into account the average cross-sectional area of the borehole, the average area to be occupied by an anchor pin, and the penetration factor of the anchoring adhesive into the walls of the borehole. The rope is cut to yield a slug of desired size before or after insertion into a borehole.

BACKGROUND OF THE INVENTION

Chemical anchoring adhesives are known which are composed of two or more components that react together and cure when mixed. U.S. Pat. No. 5,730,557, issued to Skupian et al., discloses a mortar mixture capsule unit for chemical attachment of anchors in boreholes. The capsule houses a filler material, and a chemical binder system contained in smaller capsules within the filler material. The cartridge is inserted into a borehole, and a driving tool is used to insert an anchor. The driving tool imparts motion to the anchor, which ruptures both the housing capsule and the smaller capsules contained within it, causing the chemical binder system to interact and mix with the filler. The interaction and mixing causes reaction and curing of the binder system/filler mixture, thereby securing the anchor within the borehole. A similar adhesive is sold by Hilti AG under the trade name "HVU".

U.S. Pat. No. 5,731,366, issued to Moench et al., discloses a chemical plugging compound based on a free-radically polymerizable resin and a free-radical initiator spatially separated therefrom. The spatial separation can be effected by encapsulating the initiator in glass, gelatin or cellulose capsules. The plugging compound is described as being self-supporting and storage stable.

These and other prior art chemical anchoring adhesives and methods have certain disadvantages. One disadvantage is that one or both components are fluid, and must be wrapped, encapsulated or otherwise enclosed in a package prior to use. Thus, it is often not easy to vary the amount of adhesive used in a borehole, or the size of the housing capsule, while at the job site. Put another way, oversized and undersized boreholes often receive the same amount of predetermined, pre-packaged adhesive as boreholes of standard size.

Another disadvantage is that fluid adhesives may flow or spill from the boreholes during use, particularly after the package is ruptured by the anchor being driven. This problem is especially acute when the borehole is upside down and vertical, but also exists when the borehole is horizontal, or at an angle between horizontal and upside down vertical. Even when the adhesive is not completely fluid, the shapes of the prior art cartridges are typically not self-retentive, i.e., the cartridges will fall from overhead boreholes.

Another disadvantage is that the two components, binder and filler, must be completely segregated prior to use, to prevent premature interaction and reaction. The encapsulation techniques used to accomplish this require some precision and expense. Also, there is no assurance that the smaller capsules used to contain the binder will remain evenly dispersed among the filler until the adhesive capsule is used. Uneven dispersion of the binder and filler can lead to uneven or inadequate adhesion of the anchor.

Cartridge adhesives are another type of prior art adhesive. Cartridge adhesives include two separate parts which are simultaneously injected into a borehole using a two-barrel caulking gun which brings the two parts together at the point of injection, whereupon they react upon entering the borehole. Disadvantages of cartridge adhesives and methods include excessive packaging waste, excessive adhesive waste due to unmixed, unused material remaining in the caulking barrels, and insufficient viscosity, which permits the material to run out of vertical overhead boreholes, and to sag in horizontal boreholes.

SUMMARY OF THE INVENTION

The present invention is directed to a method of measuring and applying a chemical anchoring adhesive to the interior of a borehole. The method includes the steps of designing a chemical anchoring adhesive in the form of an elongated rope or slug having a substantially uniform cross-sectional area along its length. The cross-sectional area of the chemical anchoring adhesive is determined by providing a borehole having a first average cross-sectional area; providing an anchor pin having a second average cross-sectional area that is smaller than the first average cross-sectional area; and determining an average penetration factor of the anchoring adhesive into the walls of the borehole. The desired cross-sectional area of the rope or slug of chemical anchoring adhesive is then determined from the following equation:

Cross-sectional area of adhesive=(First area minus second area)× Penetration factor The penetration factor reflects the fact that some of the adhesive penetrates into the walls of a borehole, which may be formed in concrete or another porous material. For the best anchoring results, it is desired to completely fill the space between the anchor pin and wall of the borehole with anchoring adhesive. Because of the penetration factor, the amount of adhesive required to fill this space cannot simply be calculated based on the volumetric difference, or average areal difference, between the wall of the borehole and the anchor pin. Rather, the amount of adhesive needed must be increased to account for the penetration factor, after the average areal difference has been calculated.

For a particular construction application, there are often a large number of boreholes having the same first average diameter. A large number of anchor pins with the same second average diameter are inserted into the boreholes. The penetration factor is a function of the first average diameter, the second average diameter, and the type of material (e.g., the porosity of the material) in which the borehole is formed. For these applications, the penetration factor can be determined empirically by applying varying measured amounts of anchoring adhesive into test boreholes having known dimensions and volume, driving anchoring pins into the boreholes, and determining what volume of adhesive causes the interstitial space in the borehole to be filled after the anchor pin is driven. Once the volume of adhesive is determined, the penetration factor can be determined by dividing the adhesive volume needed to fill the interstitial space by the apparent volume of the interstitial space. The apparent volume of the interstitial space is equal to:

Depth of borehole×($A_1$−$A_2$)

where $A_1$ is the average cross-sectional area of the borehole, and $A_2$ is the average cross-sectional area of the anchor pin.

Once the penetration factor is known, the desired cross-sectional area of the adhesive rope or slug can be determined from the first equation presented above. As long as the borehole material type, borehole diameter (or cross-sectional area) and anchor pin diameter (or cross-sectional area) remain essentially constant, the penetration factor, and desired cross-sectional area of an adhesive slug, will remain constant for boreholes of any depth. This is particularly useful in construction applications, where boreholes often vary in depth but not diameter.

Once the adhesive rope having the desired cross-sectional area has been provided, the rope can be cut or sheared into slugs having lengths that are precisely equal to the depths of the boreholes in which they are inserted. When the anchor pin is driven, the anchor adhesive will precisely fill the interstitial space between the pin wall and the borehole wall.

With the foregoing in mind, it is a feature and advantage of the invention to provide a method for determining and applying an amount of chemical anchoring adhesive that is precisely suited to fill the interstitial cavity between the wall of a borehole and an anchor pin inserted therein.

It is also a feature and advantage of the invention to provide a method of manufacturing a chemical anchoring adhesive that is precisely suited to fill the interstitial cavity between the wall of a borehole and an anchor pin to be inserted therein.

It is also a feature and advantage of the invention to provide a chemical anchoring adhesive, anchor pin and borehole system in which the diameter of the adhesive is selected so that the adhesive can be cut to a length equal to the depth of the borehole, and has a cross-sectional area selected to precisely fill the interstitial cavity between the anchor pin and wall of the borehole.

The foregoing and other features and advantages will become further apparent from the following detailed description of the presently preferred embodiments, read in conjunction with the accompanying drawings.

DETAILED DESCRIPTION OF THE PRESENTLY PREFERRED EMBODIMENTS

Figure 1:
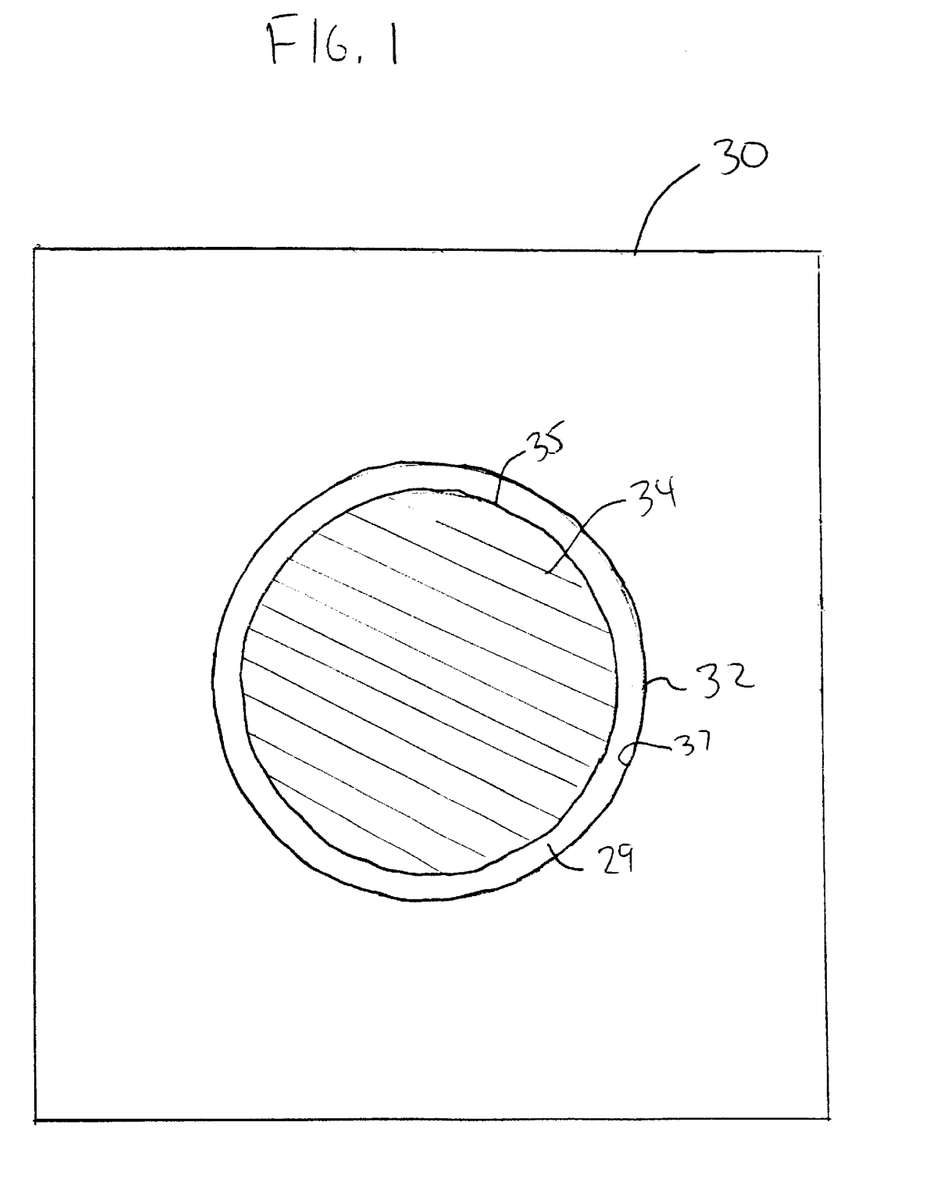
FIG. 1 is an end view of a substrate, such as a concrete block, showing an anchor pin mounted in a borehole.

Referring to FIG. 1, a borehole 32 is formed in a substrate 30 which may, for instance, be a concrete block. The borehole 32 has a first average cross-sectional area "$A_1$", which is the area inside the outer circle representing borehole 32, and which represents the average cross-sectional area of the borehole. The borehole 32 also has a depth "D" and a volume "$V_1$". The borehole 32 is cylindrical, and has a substantially uniform cross-section from top to bottom.

An anchor pin 34, shown in cross-section, is inserted into the borehole 32 and extends to the bottom of borehole 32. Anchor pin 34 has a second average cross-sectional area $A_2$, which represents the average cross-sectional area of the portion of the anchor pin within the borehole. The length of anchor pin 34 within borehole 32 is about or nearly equal to the depth of borehole 32. The interstitial space 29 is the space between the outer wall 35 of anchor pin 34, and the inner wall 37 of borehole 32. The interstitial space 29 has an average cross-sectional area equal to the difference $A_1$ minus $A_2$. The interstitial space 29 is where anchoring adhesive is used to secure the anchor pin in place inside the borehole. In accordance with the invention, a method and anchoring adhesive slug are provided which will substantially fill the interstitial space 29 with a proper amount of adhesive.

Figure 2:
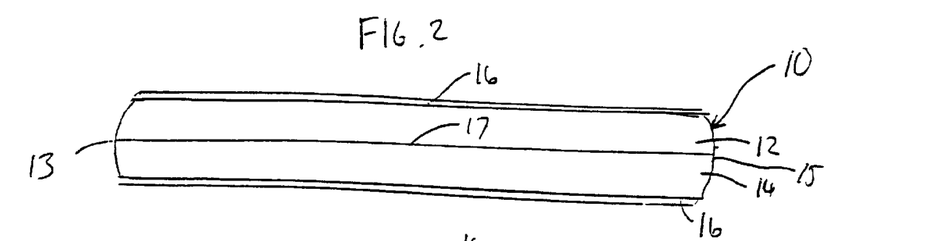
FIG. 2 illustrates a segment or slug of the highly viscous, essentially solid anchoring adhesive used in the method of the invention, prior to insertion into a borehole.
Figure 3:
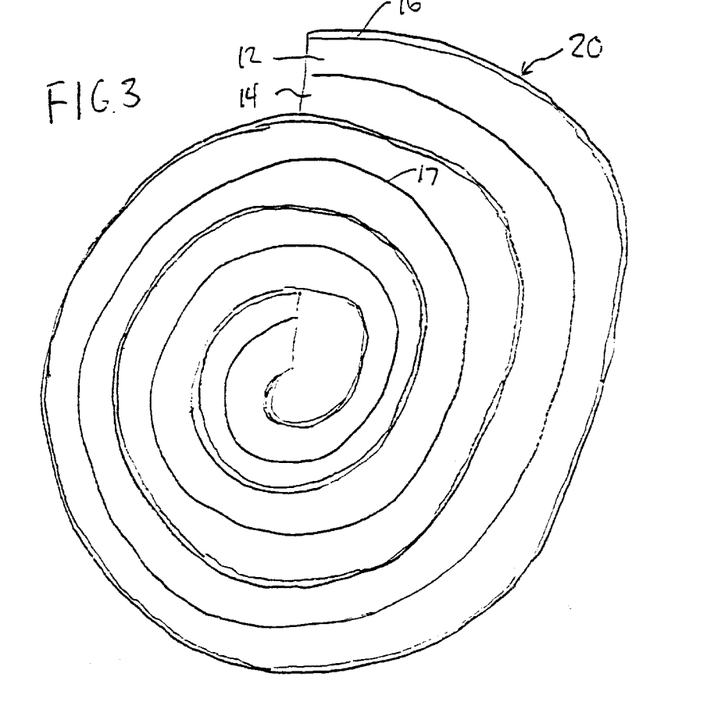
FIG. 3 illustrates the highly viscous adhesive composition, prior to cutting into slugs, wound up into a coiled rope.

The cross-sectional area of the interstitial space 29 need not be large, and may be defined as a percentage of the average cross-sectional area $A_1$ inside the borehole. Generally, the cross-sectional area of the interstitial space should constitute about 5–40% of the average area $A_1$ inside the borehole, preferably about 10–30%, more preferably about 15–25%. Similarly, the average cross-sectional area $A_2$ occupied by the anchor pin should constitute about 60–95% of the average cross-sectional area $A_1$ inside the borehole, preferably about 70–90%, more preferably about 75–85%. Referring to FIGS. 2 and 3, the method of the invention includes the step of providing the chemical anchoring adhesive in the form of a slug 10, or in the form of a rope 20 from which slugs 10 can be cut. The slug 10 has a substantially uniform cross-sectional area $A_3$ along its length. The rope 20 may be wound up into a coil during storage, and may be unwound as it is used. Rope 20 (or slug 10) of adhesive preferably includes a first part 12, which includes a resin component, and a second part 14, which includes a curing agent, joined together and touching each other along an interface 17. The rope 20 (or slug 10) may be wrapped around its circumference with a clear interface 16.

Figure 4A:
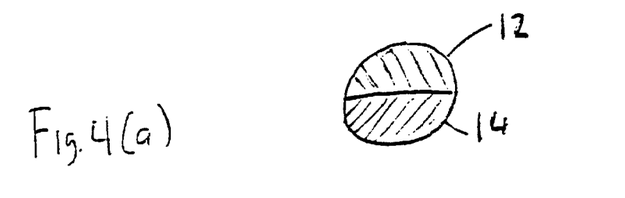
FIGS. 4(a)–4(i) illustrate, in cross-section, a wide variety of extruded configurations for the two parts of the adhesive composition used in the method of the invention.
Figure 4B:
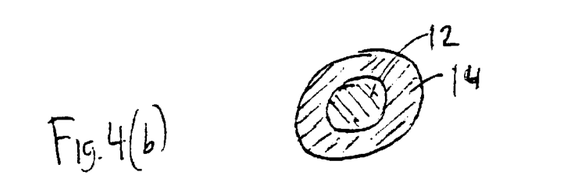
Figure 4C:
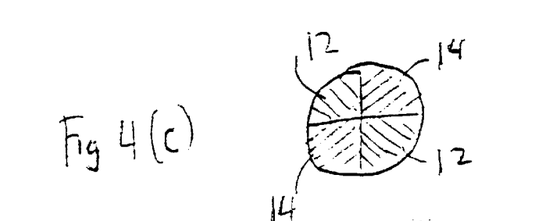
Figure 4D:
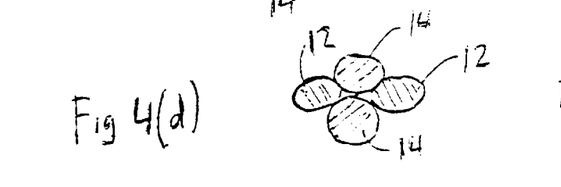
Figure 4E:
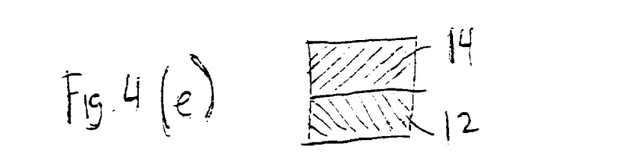
Figure 4F:
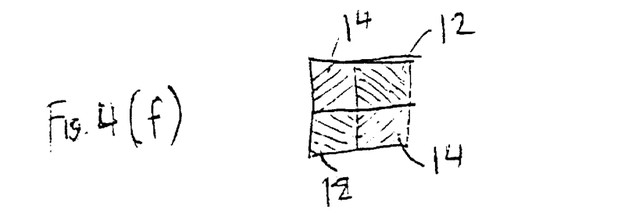
Figure 4G:
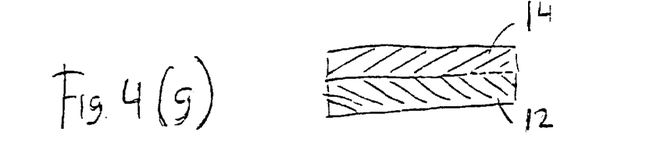
Figure 4H:
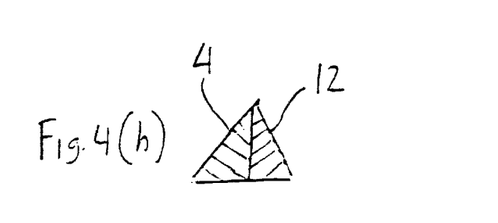
Figure 4I:
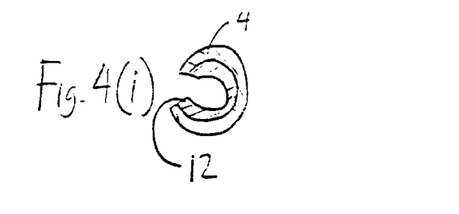

The rope 20 (or slug 10) may have a cylindrical or elliptical cross-section as shown in FIGS. 4(a) through 4(c) (with that of FIG. 4(a) being preferred), a threaded cross-section including a plurality of adjacent filaments as shown in FIG. 4(d), a square or rectangular cross-section as shown in FIGS. 4(e) through 4(g), a triangular cross-section as shown in FIG. 4(h), a curled cross-section as shown in FIG. 4(i), or any other suitable configuration. The preferred cross-sectional shape may depend, to some extent, on the shape of the borehole into which it is inserted. Also, the shape can be selected to facilitate self-retention of the rope 20 (or slug 10) in a borehole, particularly an overhead borehole.

The rope 20 (or slug 10) has a shape and composition which are substantially consistent and uniform along its entire length. This means that the cross-sectional shape as shown in any of FIGS. 4(a)–4(i), and weight ratio of the first part 12 and second part 14, are substantially consistent and unchanged along the length of rope 20 (or slug 10). The interface 17 between first part 12 and second part 14 extends the length of the rope 20 (or slug 10). The adhesive rope or slug should contain about 20–80% by weight of each of the first and second parts 12 and 14, based on the combined weight of the first part 12 and the second part 14. Preferably, the rope or slug contains about 35–75% by weight of the first part 12 and about 25–65% by weight of the second part 14, more preferably about 52–65% by weight of the first part 12 and about 35–48% by weight of the second part 14, most preferably about 57% by weight of the first part 12 and about 43% by weight of the second part 14. The rope or slug is surrounded on its side by a interface 16 which may be a plastic film, foil, paper or the like, and is preferably a polyethylene or polypropylene film.

The present invention provides a method for determining the optimum cross-sectional area of a rope 20 or slug 10 of anchoring adhesive composition. The optimum cross-sectional area of rope 20 or slug 10 is that which permits the use of slugs 10 having a length which is equal to the depth of the borehole 32, and which provides just enough volume of adhesive composition to substantially or precisely fill the interstitial space 29 between outer wall 35 of anchor pin 34, and inner wall 37 of borehole 32, once the anchor pin has been inserted as far as possible into the borehole (i.e., to the depth of the borehole). The desired cross-sectional area of the adhesive rope or slug is often somewhat greater than the average cross-sectional area $A_3$ of the interstitial space 29, due to the fact that some of the adhesive may penetrate into the wall 37 of the borehole.

In a typical construction application, the depths of boreholes 32 may vary from one borehole to another, while their cross-sectional areas are substantially consistent and uniform. Thus, the optimum cross-sectional area of the adhesive rope or slug can be determined by the following procedure.

First, a test block can be provided having boreholes of the same diameter as in the construction application, and of known depths. The test block is made of the same material as the substrate in the construction application. The substrate material may, for instance, be selected from various types of concrete, steel or other metal, glass or other ceramic, stone, plastic, wood, and the like. The chemical anchoring adhesive to be used is provided in any suitable form. Using trial and error, the volume of chemical anchoring adhesive needed to fill the interstitial space 29 between a fully inserted anchor pin 34 and borehole wall 37 is determined, for a borehole of known depth. This volume can be determined by inserting quantities of anchoring adhesive into the boreholes, and fully driving the same anchor pins into the boreholes using the same driving technique that is to be used in construction.

The optimum cross-sectional area of an anchoring adhesive rope or slug can then be determined simply by dividing the volume of anchoring adhesive needed to fill the interstitial space (and any wall penetration space) by the depth of the borehole (which is the depth of the interstitial space). An adhesive rope or slug having that cross-sectional area can then be easily measured for otherwise similar boreholes of varying depths, and similar anchor pins, by cutting the rope or slug into lengths corresponding to the depths of the boreholes. Alternatively, the penetration factor may be used.

Once the volume of adhesive needed to fill an interstitial space for a borehole of known depth is determined, the penetration factor "P" can be calculated using the following equation:

$$P = \frac{V_A}{V_1 - V_2} = \frac{V_A}{D(A_1 - A_2)}$$

where $V_A$ is the volume of anchoring adhesive used to fill the interstitial space, $V_1$ is the apparent volume of the borehole, determined from the dimensions and depth of the borehole, and $V_2$ is the apparent volume occupied by the anchor pin in the borehole, determined from the dimensions and length of the portion of the anchor pin that can be inserted into the borehole.

D=depth of borehole $A_1$=average cross-sectional area of borehole $A_2$ =average cross-sectional area of anchor pin.

For a borehole and anchor pin with non-porous surfaces, the penetration factor "P" may be about 1.0. When the borehole and/or anchor pin are porous, such as when the borehole is made from concrete, "P" will be significantly higher than 1.0. When the anchor pin is threaded, and the dimension used to calculate volume is the outer diameter of the threads, "P" will also be greater to account for the amount of adhesive needed to fill the threads.

Once the penetration factor has been determined, the optimum cross-sectional area of the adhesive rope or slug is determined as follows:

Area of adhesive=$A_3$=$P(A_1-A_2)$ where $A_1$=average cross-sectional area of borehole $A_2$=average cross-sectional area of anchor pin inserted into borehole.

The optimal cross-sectional area of adhesive, calculated above, means that an adhesive rope having this area can be cut into slugs having lengths which are equal to the depths of the boreholes. When anchor pins of the same diameter and material construction are driven into boreholes of the same diameter and material construction as used to determine the penetration factor, the adhesive slug having a length equal to the depth of the borehole will provide just enough adhesive to fill the interstitial space, after the anchor pin is fully driven. Thus, the problem associated with using too much anchor adhesive (resulting in waste) or too little adhesive (resulting in lower anchor strength) can be overcome.

Figure 5:
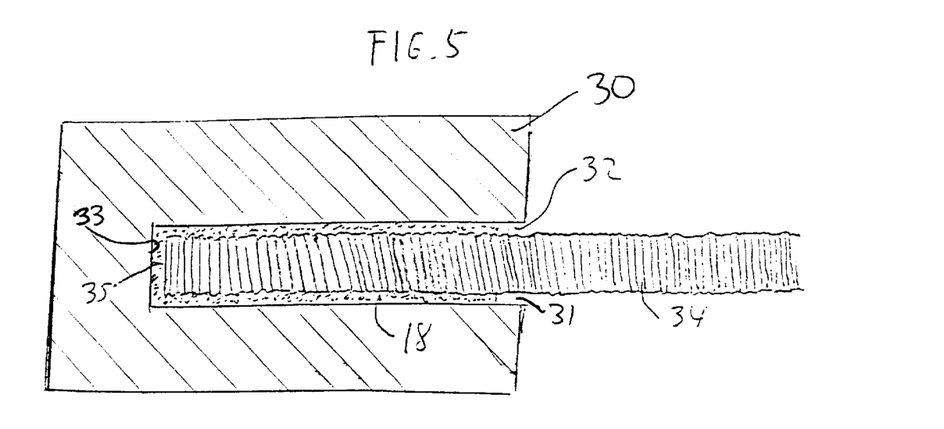
FIG. 5 illustrates a side sectional view of a borehole, and an anchoring pin held into the borehole, following use of the highly viscous adhesive composition.

The rope 20 of adhesive composition may be cut or sheared to any desired length to provide slugs 10, each having ends 13 and 15 as shown in FIG. 1. This cutting may occur away from or at the construction site, so as to form slugs 10 of different lengths corresponding to varying depths of boreholes. Referring to FIG. 5, for instance, rope 20 may be inserted into borehole 32 in structure 30 as far as possible, and then cut or sheared at the entrance of the borehole leaving a slug 10 whose length substantially corresponds to the depth of the borehole. Alternatively, a precut slug 10 may be inserted into the borehole. A driving tool (not shown) is then used to drive an anchor pin 34 into the borehole 32. A typical anchor pin 34 may be threaded, and may have a flat or pointed forward end 35. A typical driving tool uses rapid rotational motion to spin the anchor pin into the borehole. The driving tool may operate at about 500–3000 rpm, suitably about 1000–2500 rpm, desirably about 1400–2000 rpm. Some driving tools employ a combination of hammering (axial motion) and rotational motion. In one embodiment, a slug 10 may be physically attached to the end of a driving tool, and inserted into the borehole during use of the driving tool.

The movement of the driving tool, and consequent motion of the anchor pin 34, causes disintegration of the interface 16 and mixing of the first part 12 and second part 14 of adhesive slug 10, within the borehole. The interface 16 shreds and mixes with the adhesive parts and, to some extent, may aid in the mixing. The threads on the anchor pin 34 aid in the mixing. As the anchor pin 34 is driven into the borehole 32, the entire adhesive slug 10 is blended into a substantially homogeneous mixture 18 which fills most of the spaces between anchor pin 34 and the inner walls of borehole 32. The mixing action also causes substantial curing of the mixture 18 to firmly secure the anchor pin 34 within borehole 32.

In order to retain a uniform elongated shape having uniform cross-sectional area along its length, the adhesive should have an essentially solid, putty-like consistency. The first part 12 of the adhesive rope or slug may have a viscosity of about 5 million to about 50 million centipoise at 25° C., preferably about 20 million to about 45 million centipoise, more preferably about 30 million to about 40 million centipoise. The viscosity can be measured using a Brookfield Viscometer, Model DV-3, made by Brookfield Engineering Co., using the procedure set forth in the manufacturer's instructions. The second part 14 of the adhesive rope or slug may have a viscosity of about 5 million to about 50 million centipoise at 25° C., preferably about 20 million to about 45 million centipoise, more preferably about 30 million to about 40 million centipoise. The foregoing viscosities ensure that the first and second parts 12 and 14 essentially have a solid phase, putty-like consistency, allowing the adhesive rope 20 to be cut into slugs 10, compressed, or otherwise deformed at will, but preventing flowing, spilling and other random deformation of the adhesive composition. The optimum cross-sectional area determined from the penetration factor can thus be maintained until the adhesive rope is cut into slugs having lengths equal to the depths of boreholes, and used.

To facilitate manufacturing of the two-part adhesive rope 20, and later mixing of the two parts in a borehole, the viscosities of the two parts 12 and 14 should be close to each other, and are preferably substantially matched. Generally, the viscosity of the second part 14 should be no more than 30% higher or 30% lower than the viscosity of the first part 12. Preferably, the viscosity of the second part 14 is no more than 20% higher or 20% lower than the viscosity of the first part 12. More preferably, the viscosity of the second part 14 is no more than 10% higher or 10% lower than the viscosity of the first part 12. Most preferably, the two viscosities are substantially the same.

In one embodiment, the first part 12 of the adhesive includes about 20–45% by weight of an epoxy resin, about 10–40% by weight of a first particulate filler, and about 40–65% by weight of a second particulate filler. Preferably, the first part 12 of the adhesive includes about 25–35% by weight of the epoxy resin, about 12–25% by weight of the first particulate filler, and about 45–60% by weight of the second particulate filler. More preferably, the first part 12 of the adhesive includes about 26–30% by weight of the epoxy resin, about 16–20% by weight of the first particulate filler, and about 52–58% by weight of the second particulate filler.

The epoxy resin is preferably a liquid epoxy derivative. Novolac epoxy resins are particularly suitable, and bisphenol epoxy resins are preferred. One particularly suitable bisphenol epoxy resin is available from Shell Chemical Co. under the trade name EPON®828. EPON®828 is a difunctional bisphenol A/epichlorohydrin derived from liquid epoxy. Other suitable epoxy resins include ARALDITE®610, available from Ciba-Geigy; and DER 331, available from Dow Chemical Co.

The first particulate filler should have an oil absorption value of at least about 30, measured using ASTM D281-31. Preferably, the first particulate filler has an oil absorption of at least about 40, more preferably at least about 50. One suitable first filler is talc, having a particle size of about 1 micron to about 50 microns. One suitable talc filler is Talc 399 sold by the Whitaker, Clark & Daniels Corporation. Other suitable talcs are Mistron ZSC from Cyprus Minerals, and MP12-50 from Pfizer Chemical Co. Other suitable first particulate fillers, having similar particle size ranges, include calcium carbonate, glass beads, silica, fly ash, clay, and the like. These other fillers are less desirable than talc.

The second particulate filler is different from the first, and can be defined in terms of U.S. Sieve size. At least about 70% by weight of the filler particles should have a U.S. Sieve size between 16 and 45, inclusive. Preferably, at least about 80% by weight of the filler particles, and more preferably at least about 90% by weight of the filler particles, have a U.S. Sieve size between 16 and 45. Particulate filler within this size range facilitates optimum extrusion during manufacturing, excellent mixing of the adhesive during use due to action of a driving tool, shredding of the interface 16 during mixing, and excellent bond strength of the cured adhesive. Filler having significant amounts of larger (lower U.S. Sieve size) particles provides good in-hole mixing and wrapper shredding, but causes extrusion and/or forming difficulties during manufacture of the adhesive rope. Filler having significant amounts of smaller particles (higher U.S. Sieve size) provides excellent extrusion and/or forming during manufacture of the adhesive, but facilitates poor in-hole mixing, wrapper shredding and bond strength of the adhesive.

Suitable second fillers contributing to in-hole mixing of Parts A and B include silica sand, glass beads, and quartz. One particularly suitable filler is a sand, for example, a silica sand sold as AGSCO® Sand No. 1, by the Agsco Company. For this sand, about 89.4% by weight of the particles have a U.S. Sieve size between 16 and 45.

In the one embodiment, the second part 14 of the adhesive includes about 5–20% by weight of an amine compound, meaning an amine or chemical derivative thereof but not a tertiary amine, about 0.1–15% by weight of a tertiary amine compound, meaning a tertiary amine or chemical derivative thereof, about 1–23% by weight of a first particulate filler and about 52–87% by weight of a second particulate filler. Preferably, the second part 14 includes about 10–18% by weight of the amine compound, about 1–10% by weight of the tertiary amine compound, about 5–18% by weight of the first particulate filler and about 58–72% by weight of the second particulate filler. More preferably, the second part 14 includes about 12–16% by weight of the amine compound, about 1–5% by weight of the tertiary amine compound, about 7–12% by weight of the first particulate filler, and about 62–68% by weight of the second particulate filler.

The first and second fillers in the second part 14 are selected from the same groups of fillers as the first and second fillers in the first part 12 of the adhesive composition, and may or may not be identical to the first and second fillers in the first part 12. The amine compound acts as a curing agent once the first part 12 and second part 14 have been mixed together. The tertiary amine compound acts as an accelerator for the curing reaction.

Suitable amine compounds include amines, aliphatic amines, aminoethylpiperazine, amido amines, cycloaliphatic amines, and the like. Preferred aliphatic amines include Mannich bases. One suitable Mannich base is sold by Air Products Co. under the name ANCAMINE®1856. Other suitable aliphatic amines include ANCAMINE®1767 and ANCAMINE®1768.

Suitable tertiary amine compounds include ANCAMINE®110, ANCAMINE®K61B, and ANCAMINE®K54, all sold by Air Products Co., and EPI-CURE®3253 sold by Shell Chemical Co. A preferred tertiary amine is sold by Air Products Co. under the trade name ANCAMINE®K54, and is a tris-(dimethylaminomethyl) phenol.

To manufacture the adhesive rope 20, the ingredients of the first part 12 can be mixed in a first mixer, and the ingredients of the second part 14 can be mixed in a second mixer. The separate mixers can be drum tumblers, sigma blade mixers, planetary mixers, extrusion mixers, press mixers, and the like. Vigorous mixing, requiring shear without added heat, may be employed to ensure a homogenous distribution of ingredients in each of the first part 12 and the second part 14. The first part 12 and second part 14 may then be extruded and/or pressed adjacent to each other, using separate extruders and/or presses that converge in a single die, to form the biconstituent adhesive rope shown in FIG. 2, having the interface 17 between first part 12 and second part 14 and having the optimum cross-sectional diameter calculated as explained above. Once the adhesive rope has been formed, it may be covered with interface 16 which, as explained above, can be made of plastic, foil, paper or the like, but is preferably made of a polyolefin such as polyethylene or polypropylene. After being stored as a coiled rope as shown in FIG. 2, the adhesive rope can be cut or sheared into individual slugs 10, having any desired sizes, either at the construction site or before entering the construction site.

In one embodiment, the adhesive rope 20 can be cut or sheared to produce an individual slug 10 corresponding to the depth of the borehole 32, before or after the slug is inserted into the borehole. The cutting or shearing can be accomplished using a putty knife or other suitable instrument. Then, to facilitate self-retention of the adhesive slug 10 in the borehole, the putty knife or other instrument can be used to smear the exposed end of the slug 10 against the inner wall of the borehole. The adhesive action of the slug 10 in contact with the wall of the borehole, coupled with some penetration into the wall, helps maintain the slug 10 in its desired position in the borehole prior to driving an anchor pin.

While the embodiments of the invention described herein are presently preferred, various modifications and improvements can be made without departing from the spirit and scope of the invention. The scope of the invention is indicated by the appended claims, and all changes that fall within the meaning and range of equivalents are intended to be embraced therein.

We claim:

1. A method of making chemical anchoring adhesive, comprising the steps of:
   providing a borehole having a depth D, an apparent volume $V_1$, and an average cross-sectional area $A_1$;
   providing an anchor pin having a portion extending into the borehole, the portion in the borehole having an average cross-sectional area $A_2$ which is smaller than $A_1$, and an apparent volume $V_2$;
   determining a volume $V_A$ of chemical anchoring adhesive required to fill an interstitial space between the anchor pin and an inner wall of the borehole when the anchor pin is driven into the borehole;
   determining a desired cross-sectional area $A_3$ for the anchoring adhesive from the volume $V_A$; and
   preparing a rope or slug of the anchoring adhesive having the desired cross-sectional area.

2. The method of claim 1, further comprising the steps of:
   determining a penetration factor P from one of the following equations:

$$P = \frac{V_A}{V_1 - V_2} = \frac{V_A}{D(A_1 - A_2)};$$

and
   determining the desired cross-sectional area $A_3$ of the adhesive from the following equation:

$$A_3 = P(A_1 - A_2).$$

3. The method of claim 1, further comprising the step of dividing the adhesive volume $V_A$ by the depth D to determine the desired cross-sectional area $A_3$ for the anchoring adhesive.

4. The method of claim 1, wherein the rope or slug of anchoring adhesive comprises two parts joined along an interface, each part having a viscosity of about 5 million to about 50 million centipoise.

5. The method of claim 4, wherein each part has a viscosity of about 20–45 million centipoise.

6. The method of claim 4, wherein each part has a viscosity of about 30–40 million centipoise.

7. The method of claim 1, wherein $A_2$ is about 60–95% of $A_1$.

8. The method of claim 1, wherein $A_2$ is about 70–90% of $A_1$.

9. The method of claim 1, wherein $A_2$ is about 75–85% of $A_1$.

10. A method of making and applying a chemical anchoring adhesive, comprising the steps of:
    providing a test borehole having a depth D, an apparent volume $V_1$, and an average cross-sectional area $A_1$;
    providing an anchor pin having a portion extending into the test borehole, the portion in the borehole having a length substantially equal to D, an average cross-sectional area $A_2$ which is smaller than $A_1$, and an apparent volume $V_2$;
    determining a volume $V_A$ of chemical anchoring adhesive required to fill an interstitial space between the anchor pin and an inner wall of the test borehole when the anchor pin is driven into the test borehole;
    determining a desired cross-sectional area $A_3$ for the anchoring adhesive from the volume $V_A$;
    preparing a rope of the anchoring adhesive having the desired cross-sectional area;
    cutting the rope to form a slug having a length equal to the depth of a second borehole;
    inserting the slug into the second borehole; and
    driving a second anchor pin into the second borehole;
    wherein the anchoring adhesive fills an interstitial space between the second anchor pin and an inner wall of the second borehole after the second anchor pin is driven.

11. The method of claim 10, further comprising the steps of:
    determining a penetration factor P from one of the following equations:

$$P = \frac{V_A}{V_1 - V_2} = \frac{V_A}{D(A_1 - A_2)};$$

and
    determining the desired cross-sectional area $A_3$ of the adhesive from the following equation:

$$A_3 = P(A_1 - A_2).$$

12. The method of claim 10, further comprising the step of dividing the adhesive volume $V_A$ by the depth D to determine the desired cross-sectional area $A_3$ for the anchoring adhesive.

13. A method of applying a chemical anchoring adhesive, comprising the steps of:
    providing a borehole having a depth D, a penetration factor P, and an average cross-sectional area $A_1$;
    providing an anchor pin having an average cross-sectional area $A_2$;

providing a slug of anchoring adhesive having a length equal to the depth D of the borehole, and an average cross-sectional area $A_3$ determined by the following equation:

$$A_3 = P(A_1 - A_2);$$

inserting the slug of anchoring adhesive into the borehole; and driving the anchor pin into the borehole.

14. The method of claim 13, wherein $A_2$ is about 60–95% of $A_1$.

15. The method of claim 13, wherein $A_2$ is about 70–90% of $A_1$.

16. The method of claim 13, wherein $A_2$ is about 75–85% of $A_1$.

17. The method of claim 13, further comprising the step of smearing an end of the slug of anchoring adhesive against an inner wall of the borehole prior to driving the anchor pin.

18. An anchoring system comprising a substrate having a borehole, an anchor pin, and a chemical anchoring adhesive;

the borehole having a depth D, a penetration factor P, and an average cross-sectional area $A_1$;

the anchor pin having an average cross-sectional area $A_2$; and an anchoring adhesive in elongated form having an average cross-sectional area $A_3$;

wherein $A_3 = P(A_1 - A_2)$; and the anchoring adhesive comprises first and second parts joined along an interface, each part having a viscosity of about 5 million to about 50 million centipoise.

19. The system of claim 18, wherein the anchoring adhesive is in the form of a slug having a length equal to the depth D.

20. The system of claim 18, wherein each part has a viscosity of about 20–45 million centipoise.

21. The system of claim 18, wherein each part has a viscosity of about 30–40 million centipoise.

22. The system of claim 18, wherein $A_2$ is about 60–95% of $A_1$.

23. The system of claim 18, wherein $A_2$ is about 70–90% of $A_1$.

24. The system of claim 18, wherein $A_2$ is about 75–85% of $A_1$.

25. A method of applying a chemical anchoring adhesive, comprising the steps of:

providing a borehole having a depth D, a penetration factor P, and an average cross-sectional area $A_1$;

providing an anchor pin having an average cross-sectional area $A_2$;

providing a slug of anchoring adhesive;

inserting the slug of anchoring adhesive into the borehole;

smearing at least some of the slug of anchoring adhesive against an inner wall of the borehole to facilitate self-retention of the slug; and driving the anchor pin into the borehole;

wherein the slug of anchoring adhesive has an average cross-sectional area $A_3$ determined from the following equation:

$$A_3 = P(A_1 - A_2).$$

* * * * *